United States Patent
Atluri et al.

(10) Patent No.: US 11,309,707 B2
(45) Date of Patent: Apr. 19, 2022

(54) VARIABLE OVERCURRENT PROTECTION FOR POWER SUPPLIES

(71) Applicant: Hewlett Packard Enterprise Development LP, Houston, TX (US)

(72) Inventors: Rama Prasad Atluri, Houston, TX (US); William James Walker, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 500 days.

(21) Appl. No.: 16/227,895

(22) Filed: Dec. 20, 2018

(65) Prior Publication Data

US 2020/0204060 A1 Jun. 25, 2020

(51) Int. Cl.
*H02H 9/02* (2006.01)
*G06F 1/30* (2006.01)
*H02H 3/08* (2006.01)
*H02M 1/32* (2007.01)

(52) U.S. Cl.
CPC .............. *H02H 9/02* (2013.01); *G06F 1/30* (2013.01); *H02H 3/08* (2013.01); *H02M 1/32* (2013.01)

(58) Field of Classification Search
CPC ... H02M 1/32; G06F 1/30; G06F 1/28; H02H 3/08; H02H 9/02
USPC .......................................................... 361/87
See application file for complete search history.

(56) References Cited

U.S. PATENT DOCUMENTS

| | | | |
|---|---|---|---|
| 7,149,098 B1 | 12/2006 | Chen | |
| 8,737,024 B2 | 5/2014 | Nanov | |
| 9,667,060 B1 | 5/2017 | Sizikov | |
| 9,825,518 B2 | 11/2017 | Shen et al. | |
| 9,899,825 B2 | 2/2018 | Mattos et al. | |
| 2011/0267728 A1* | 11/2011 | Guillot ............... H03K 17/0822 361/87 |
| 2015/0295488 A1* | 10/2015 | Shen ...................... H02M 1/32 363/50 |

FOREIGN PATENT DOCUMENTS

CN 106951051 B * 9/2018 .......... G06F 11/0796

OTHER PUBLICATIONS

Machine Translation of Liu Chinese Patent Document CN 106951051 B Sep. 28, 2018 (Year: 2018).*
Texas Instruments Incorporated, "INA300 Overcurrent-Protection, Current-Sense Comparator," Feb. 2014, Revised Apr. 2016, pp. 1-41.

* cited by examiner

*Primary Examiner* — Kevin J Comber
(74) *Attorney, Agent, or Firm* — Sheppard Mullin Richter & Hampton LLP

(57) ABSTRACT

Systems and methods are provided for overcurrent protection in a power supply. In some embodiments, the method comprises determining a load of the power supply; selecting an over-current limit, among a plurality of the over-current limits, based on the measured load of the power supply; and responsive to an input current of the power supply, an output current of the power supply, or both exceeding the identified over-current limit, taking one or more overcurrent protection measures.

14 Claims, 9 Drawing Sheets

500

| Input Overcurrent Limits | 0-24% Load | 25-49% Load | 50-74% Load | 75-100% Load |
|---|---|---|---|---|
| Low Line (100-120 Vac) | 4A | 6.5A | 9A | 12A |
| High Line (200-240 Vac) | 2A | 3.5A | 5A | 6A |

FIG. 5

| Output Overcurrent Limits | 0-24% Load | 25-49% Load | 50-74% Load | 75-100% Load |
|---|---|---|---|---|
| 12.0Vdc – 12.3Vdc | 50A | 66A | 80A | 100A |

VARIABLE OVERCURRENT PROTECTION FOR POWER SUPPLIES

DESCRIPTION OF RELATED ART

Power supplies primarily convert electric power from a utility power source into the correct voltage, current, and frequency required for one or more electrical loads. Accordingly, power supplies include a power input connector (to receive electric current from a power source) and a power output connector (to distribute the converted power to loads). Power supplies and their components are generally rated by rating agencies for various electrical parameters, identifying the maximum amount of each parameter the component is capable of handling reliably without degrading or failing.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 5 shows an input overcurrent table according to embodiments of the technology disclosed herein.

Figure 1:
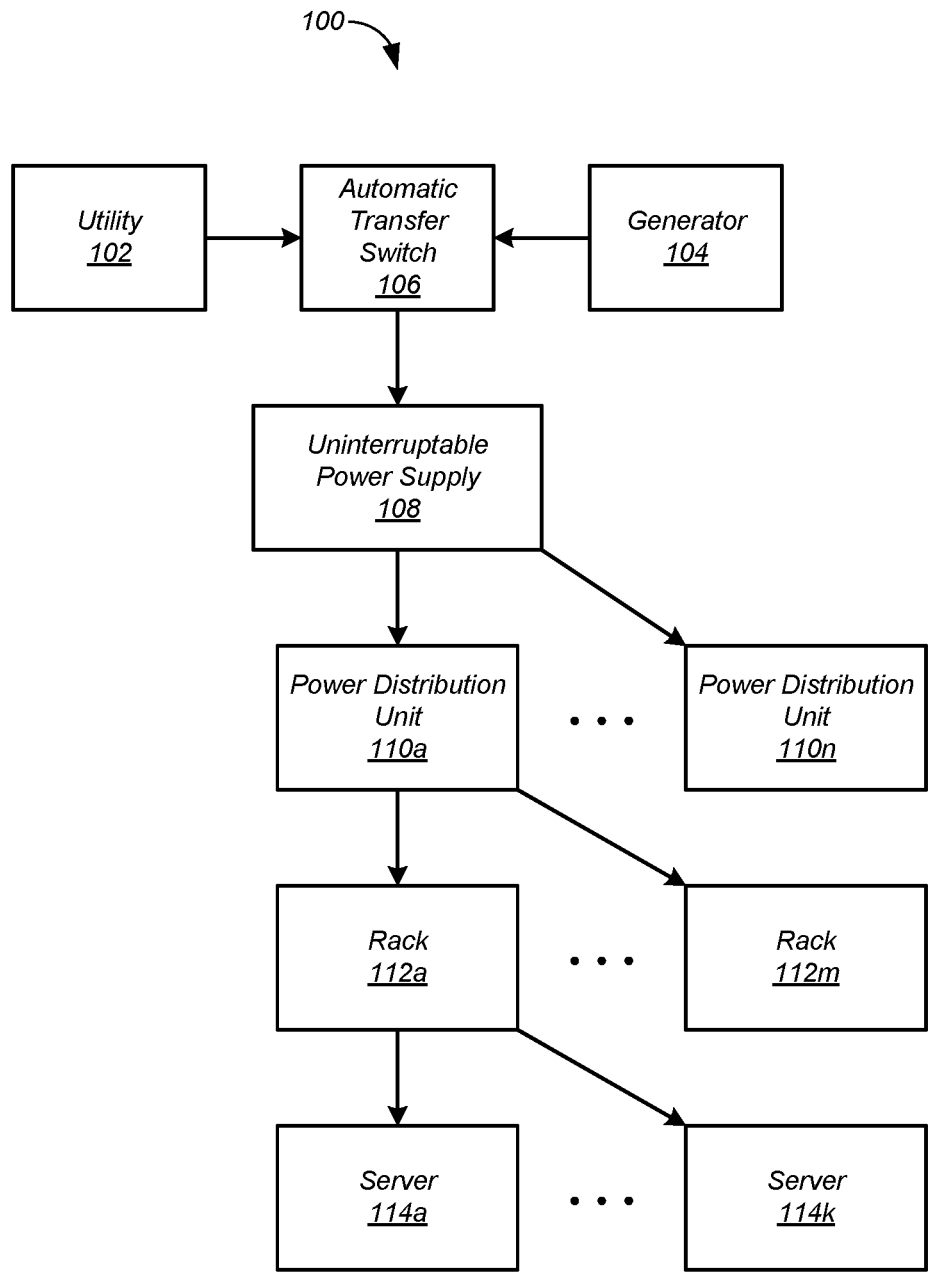
FIG. 1 is a block diagram of the power distribution system in which the technology described herein may be employed.

The figures are not exhaustive and do not limit the present disclosure to the precise form disclosed.

DETAILED DESCRIPTION

Traditionally, power supplies used to power a system include some form of output overcurrent protection. This protection seeks to protect the system components from damage due to conditions such as, for example, a short circuit within the system. One or more components within the power supply may be included to monitor the current being drawn by the various system components (i.e., loads) during operation. If that current exceeds a certain amount (possibly indicating a short circuit or other issue), the overcurrent protection components can trigger a shutdown of the power supply to attempt to protect the system from major damage.

As processing speeds and complexity increase, servers are increasingly drawing more and more power. Accordingly, the operational demands on power supplies has also increased. Because voltage within the system generally needs to remain constant, the accepted current range for high-power application power supplies can approach (and exceed) the current rating of the standard input line cord and input interface of the power supplies. Traditionally, it was the power supply's ability to generate the required power for the system that served as the limiting factor, but in these high-power situations it can be the input side of the power supply that is the limiting factor.

As the input side of the power supply is isolated from the system, output overcurrent protection fails to protect the input side components of the power supply. In high-power scenarios, the current being drawn by the system may be within the system's normal operating range, but it could exceed the worst-case rating of the input components of the power supply. This compromises the reliability of the power supply, raises the potential for thermal damage to the input components, and result in violations of regulatory requirements that all components are operating at less than or equal to 100% of their electrical component ratings. One solution would be to use higher rated input components. However, this would require a deviation from the standard input cable used with power supplies, necessitating power supplies with a larger form factor to accommodate the input connector components (and additional components to handle the larger input power). This adds high cost, requiring design work for the power supply, thereby necessitating an increase in the form factor of the server, thereby necessitating design of a server rack to accommodate the changed form factor, and other cascading effects.

Embodiments of the present disclosure enable the dependable use of standard rated line cords and interfaces with power supplies serving the high power needs of today's servers and other computing devices. Through monitoring of the load of the power supply, the embodiments can select a proper overcurrent limit for the input current of the power supply. A similar technique can be used to select a proper overcurrent limit for the output current of the power supply. Embodiments of the present disclosure employ these overcurrent limits to limit the input current and/or the output current of the power supply.

In some embodiments, through communication with a management controller of the server, the power supply may receive an indication of a planned increase in the load. In such embodiments, the power supply may select and enforce proper overcurrent limits prior to the planned increase in load.

In some embodiments, the input overcurrent limit is selected based on the load and the input voltage of the power supply. In such embodiments, the power supply may detect a change in the input voltage, and may select and enforce a new input overcurrent limit accordingly. In such embodiments, the power supply may receive an indication of a planned increase in the load, and may select and enforce a proper input overcurrent limit prior to the planned increase in the load.

Implementation of these embodiments not only keeps operating parameters of the power supply within specified ratings, but also reduces component stresses and improves the reliability of the power supply. Furthermore, many server racks include a cable assembly at the rear of the rack that obstructs airflow for the power supplies and the rack. The overcurrent protection schemes disclosed herein make it possible to fine tune overcurrent settings, and optimize power supply outputs under such difficult environmental conditions. And by limiting over currents, disclosed embodiments may prevent catastrophic failure of the power supply, for example in the case of the slow degradation of the primary or secondary power MOSFET. And in the event of a converter failure, overcurrent protection can avoid failure of components such as boost diodes and the like.

Various of the disclosed embodiments may be used in combination and or in conjunction with other overcurrent protection techniques, for example such as those disclosed in co-pending U.S. patent application Ser. No. 16/191,362, filed Nov. 14, 2018, entitled "Systems And Methods For Input Overcurrent Protection," the disclosure thereof incorporated by reference herein in its entirety for all purposes.

FIG. 1 is a block diagram of the power distribution system 100 in which the technology described herein may be employed. Referring to FIG. 1, power may be provided by a utility 102, generator 104, or the like. An automatic transfer switch 106 may be employed to pass power to an uninterruptible power supply 108, which may be located at a data center or the like. The uninterruptible power supply 108 may include one or more batteries (not shown) in the event power is unavailable from the automatic transfer switch 106. In a typical data center application, the uninterruptible power supply 108 provides power to a number of power distribution units 110a through 110n. Each of the power distribution units 110 distributes power to a number of racks 112a through 112n. Each rack 112 may include a number of servers 114a through 114n, and may distribute power to the servers 114 in the rack.

Figure 2:
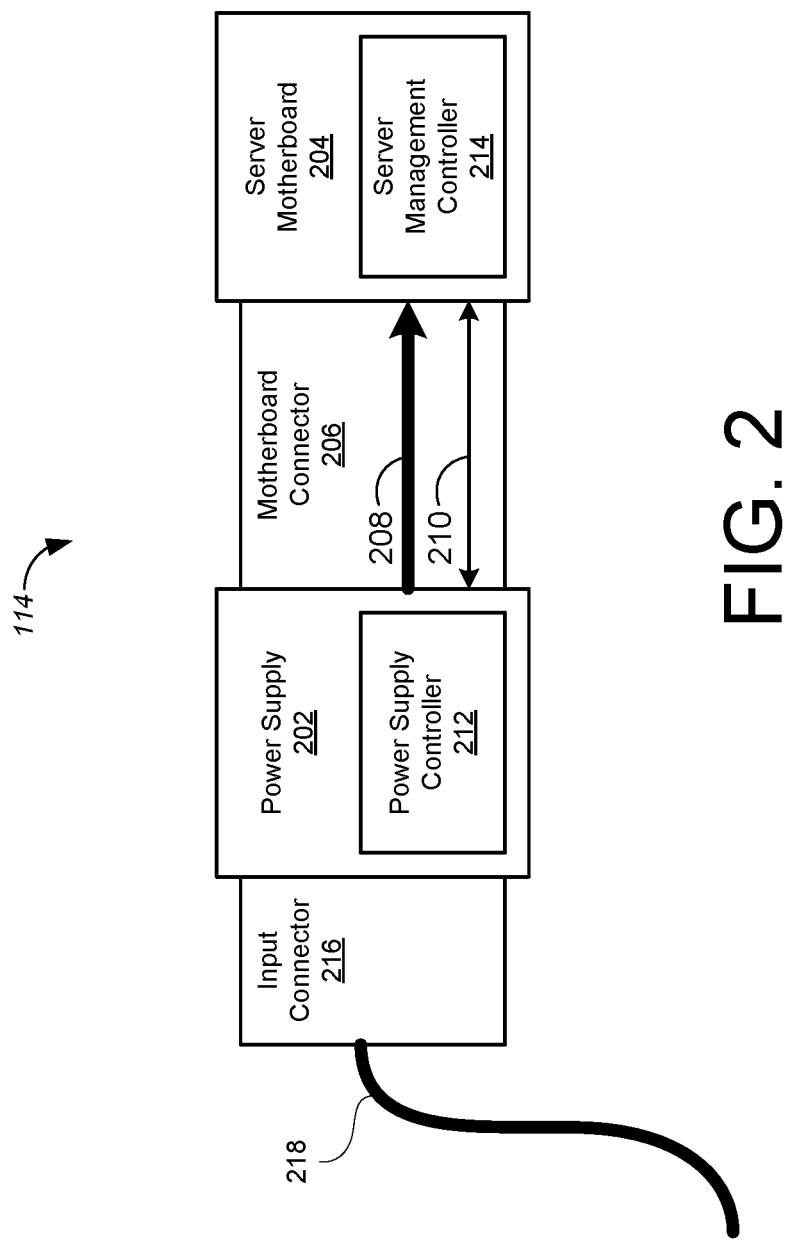
FIG. 2 is a block diagram of a server in accordance with embodiments of the technology disclosed herein.

FIG. 2 is a block diagram of a server 114 in accordance with embodiments of the technology disclosed herein. Referring to FIG. 2, the server 114 includes a power supply 202, and a server motherboard 204. The power supply 202 and the server motherboard 204 are connected by a motherboard connector 206. The power supply 202 includes a power supply controller 212. The server motherboard 204 includes a server management controller 214. The power supply 202 receives input power through an input connector 216 and an input power cord 218. The input power may be an alternating current (AC) input or a direct current (DC) input). The power supply 202 provides power to the server motherboard through a power bus 208. The power supply controller 212, and the server management controller 214, communicate over a data bus 210. The data bus 210, and the communication protocols used thereon, may be implemented according to the Inter-Integrated Circuit (I2C) protocol.

Figure 3:
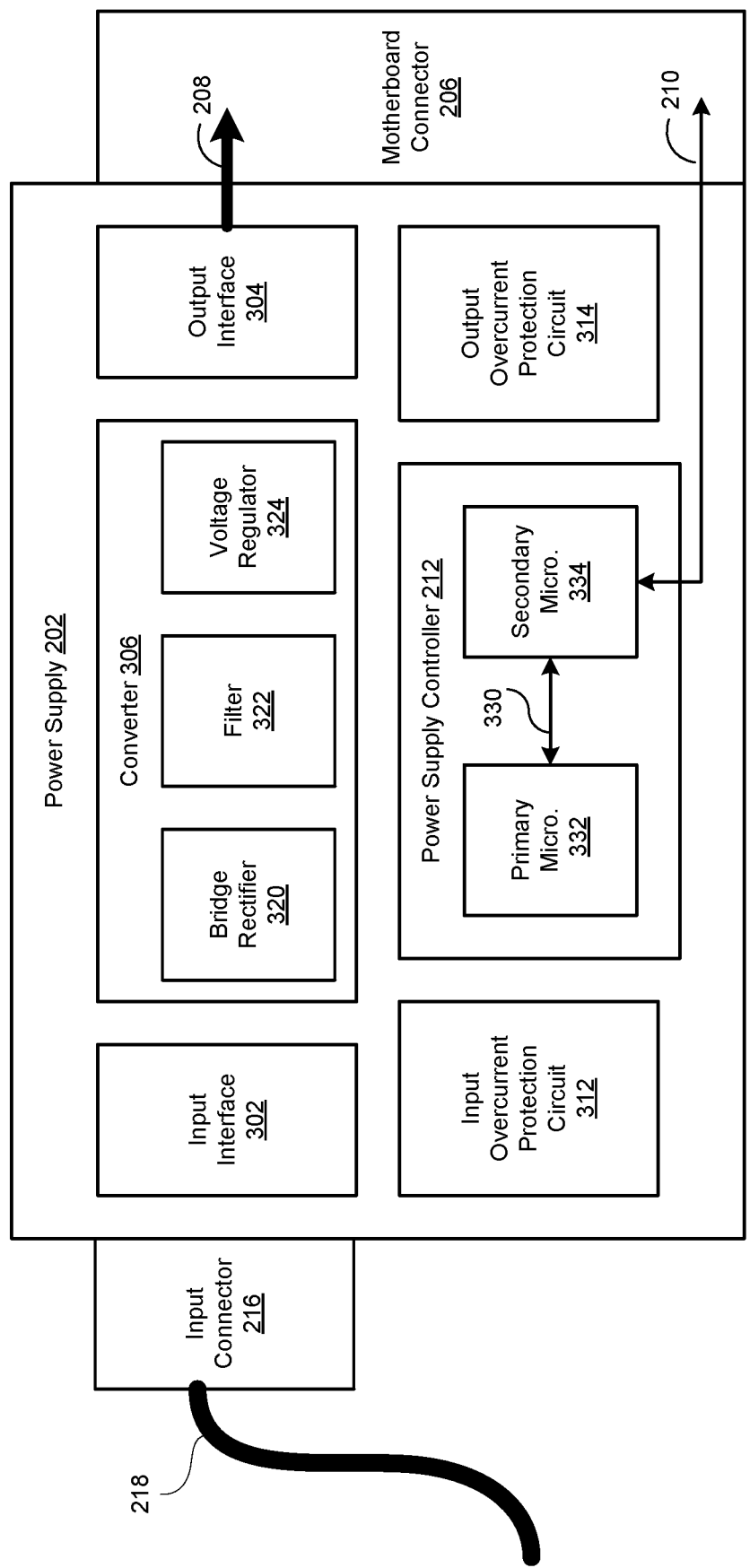
FIG. 3 illustrates an example power supply with overcurrent protection in accordance with embodiments of the technology disclosed herein.

FIG. 3 illustrates an example power supply 202 with overcurrent protection in accordance with embodiments of the technology disclosed herein. As illustrated, the example power supply 202 includes an input interface 302. In various embodiments, the input interface 302 can be an EMI Filter.

The input interface 302 is generally connected to a converter 306 of the power supply 202. In various embodiments, a bridge rectifier 320 (e.g., a full-wave rectifier) may be included in the converter 306 where the input signal is AC. In implementations in which the power supply output is in DC, the bridge rectifier 320 may be included to transform the AC input signal received into a constant polarity output. For a DC input power supply, no bridge rectifier 320 is required. Whether a bridge rectifier 320 is used or not, the input signal may be filtered via a filter 322, and the output voltage adjusted using, for example, a voltage regulator or DC-DC converter 324. The filter 322 helps to smooth out the signal (whether direct DC or rectified DC) so that a near constant voltage is applied to the loads. The voltage regulator 324 prevents changes in the filtered DC voltage that might otherwise be caused by variations in the input voltage and may also provide the isolation for safety and load voltage matching. The converter 306 is connected to an output interface 304.

The example power supply 202 can also include an output overcurrent protection circuit 314. The output overcurrent protection circuit 314 can be similar to conventional output overcurrent protection circuits and solutions used in the field to provide output overcurrent protection to power supplies. As discussed above, however, output overcurrent protection solutions in conventional power supplies are generally isolated from the input interface 302 of the power supply, and are focused instead on ensuring protection of the system connected to the output of power supply 202. As such, the existence of the output overcurrent protection circuit 314 does not provide protection of the input interface 302 or the input components (e.g., the input cable 218 and the input connector 216) connected thereto.

In some embodiments, the input interface 302 in various embodiments can include one or more input fuses (not pictured). An input fuse is intended to provide protection where there is a catastrophic failure of the power supply. Generally, an input fuse is rated for greater than two times the maximum input current the power supply would draw if the system was operating at full load, but other fuse ratings can be provided. In high-power scenarios, that rating could easily exceed the input current rating for the input components or the input interface 302. For example, it is possible that the system may draw current greater than the current rating of the input components, but less than the rating of the input fuse. In such cases, the power supply would continue to draw the higher current, resulting in potential thermal damage to the input components, or unreliable operation of the power supply 202. Moreover, an input fuse may be non-resettable such that once the fuse is blown, the power supply is inoperable unless and until that fuse is replaced. For users, this could cause excessive downtime at installations and the need to maintain a surplus of power supplies.

Various embodiments of power supply 202 include an input current protection circuit 312. Input overcurrent protection circuit 312 is configured to monitor the input current of the power supply from the input interface 302, prior to the converter 306. Unlike input fuses, the input overcurrent protection circuit 312 provides the capability to provide protection to input components and the input interface 302 in high-power scenarios where the loads, and the power supply, are capable of drawing above the input components' current ratings at full load.

In various embodiments, the input and output overcurrent protection circuits 312, 314 may be implemented in hardware circuitry of the power supply 202. In other embodiments, the overcurrent protection circuits 312, 314 can be implemented within one or more integrated circuit of the power supply 202. That is, the overcurrent protection circuits 312, 314 may be digital circuits within one or more integrated circuit chips. In various embodiments, the integrated circuits may be field-programmable gate arrays (FPGA), application-specific integrated circuits (ASIC), complex programmable logic devices (CPLD), or other types of digital integrated circuits. In some embodiments, the integrated circuit may be a mixed-signal integrated circuit, including both analog and digital circuits. In some embodiments, the input overcurrent protection circuit 312 and the output overcurrent protection circuit 314 may be implemented within the same integrated circuit.

The overcurrent protection circuits 312, 314 may be controlled by the power supply controller 212. The power supply controller 212 may include a primary microcontroller 332 and a secondary microcontroller 334. The primary microcontroller 332 controls the bridge rectifier 320, and communicates with the secondary microcontroller 334 over a communications bus 330, such as an I2C bus. The secondary microcontroller 334 controls the voltage regulator 324, and communicates with the server motherboard 204 over the communications bus 210.

Figure 4:
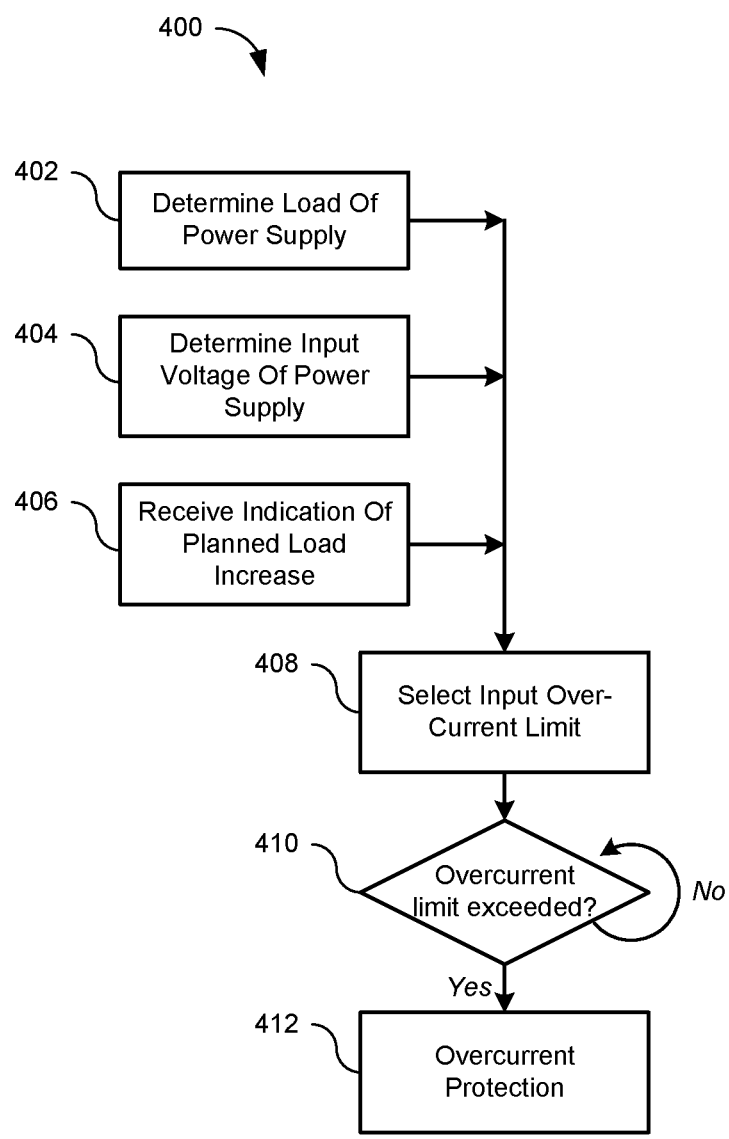
FIG. 4 shows a process for input overcurrent protection according to embodiments of the technology disclosed herein.

FIG. 4 shows a process 400 for input overcurrent protection according to embodiments of the technology disclosed herein. Referring to FIG. 4, the process may determine a load of the power supply 202, at 402. The load may be sensed by the output interface 304 of the power supply 202. For example, the output interface 304 may sense a current and voltage of the power provided by the power supply 202 over the power bus 208 of the motherboard connector 206. Output overcurrent protection circuit 314 may then determine the load according to the sensed current and voltage. As another example, the power supply controller could receive the load information from some other entity (i.e., the server management controller, or a rack management controller, etc.). As another example, the power supply controller could estimate or infer the load based on other known information, such as the number and type of loads connected to the power supply. For example, it is possible for one power supply to supply power to multiple devices (e.g., multiple servers), and to treat the number of devices as a proxy for the load. So, for example, if the power supply can supply up to 4 nodes, then if one node is connected the power supply may treat this as 25% load (regardless of what power the node is actually drawing), and if two nodes are connected the power supply may treat this as 50% load, and three nodes as 75% load, and 4 nodes as 100% load.

The process 400 may determine an input voltage of the power supply 202, at 404. Many power supplies are capable of operating with multiple input voltages, such as 110V and 220V, and the level of needed overcurrent protection may vary with the input voltage. For example, the input interface 302 may sense the input voltage appearing at the input connector 216 of the power supply 202. In some embodiments, the power supply may be able to use just one voltage setting (e.g., 110V only, or 220V only), and therefore the controller may assume that the input voltage is whatever voltage setting the power supply is configured to work with, without needing to actually measure it. In some embodiments, the power supply could be pre-configured with a particular voltage setting, and can assume based on this setting what the input voltage is. For example, even in switches that can handle both 110V or 220V, it could be the case that someone (e.g., the factory, an installation technician) needs to flip a switch or a bit to indicate which input voltage the power supply is to be used for. In such a case, the controller could consider the state of the switch or bit to determine the input voltage. In some embodiments, the power supply may infer the input voltage from other information. For example, a different type of input plug may be used with the power supply for different voltage types, and the power supply may know which type of plug is currently installed in it by, for example, mechanical keying or communicating with a smart chip that identifies the input plug, or the like.

The process 400 may receive an indication of a planned load increase, at 406. For example, the server management controller 214 of the server motherboard 204 may determine that a load increase is needed, for example in response to the demands of the server motherboard 204, and may transmit a message to the power supply controller 212 of the power supply 202 that indicates the planned load increase. The message may also indicate the amounts of the planned increase, the timing of the planned increase, or both. Alternatively, the server management controller 214 of the server motherboard 204 may set a bit on a register in the power supply 202. The secondary microcontroller 334 of the power supply 202 reads the register, and communicates the change to the primary microcontroller 332. In response, the primary microcontroller 332 changes the overcurrent limit, in the input overcurrent protection circuit 312, the output overcurrent protection circuit 314, or both.

The process 400 may select an input overcurrent limit, at 408. The input overcurrent limit may be selected according to a load of the power supply 202, and an input voltage of the power supply 202. The value that is treated as the load of the power supply 202 when selecting the input overcurrent limit may be the load determined in step 402, or may be an anticipated future load that is determined based on the planned load increase of step 406. The input overcurrent limit may be selected according to an input overcurrent limit table. The input overcurrent limit may be set using a mathematical formula employing the input voltage and the load. For example, given a overcurrent limit of A for 100% load, the controller may calculate an overcurrent limit B for any other load using a formula such as B=A*%, where % is the percentage of full load.

FIG. 5 shows an example input overcurrent table 500 for an example power supply according to embodiments of the technology disclosed herein. The input overcurrent table 500 may be stored in a memory in the power supply controller 212, the input overcurrent protection circuit 312, the output overcurrent protection circuit 314, or elsewhere within the power supply 202. In general, the input voltage may be either low line (100 to 120 VAC) or high line (200 to 240 VAC), as shown in FIG. 5. However, other input voltages may be accommodated, and reflected in the input overcurrent table 500. In the input overcurrent table 500 of FIG. 5, input overcurrent limit are specified according to percentages of full load. In particular, the percentages are broken into four quartiles in the table, each with a specified input overcurrent limit. For example, referring to FIG. 5, for a high line voltage, and an 80% load, the input overcurrent limit is 6 A. As another example, referring again to FIG. 5, for a low line voltage, and 30% load, the input overcurrent limit is 6.5 A. The values indicated in the table 500 are merely examples, and different values could be used in different implementations. In addition, the number of load ranges that are included in the table is not necessarily limited to four.

Referring again to FIG. 4, after selecting an input overcurrent limit, process 400 monitors the input current of the power supply 202 according to the selected input overcurrent limit, at 410. When the input current of the power supply 202 exceeds the selected input overcurrent limit, process 400 takes one or more overcurrent protection measures, at 412. For example, the input overcurrent protection circuit 312 may shut down the power supply 202, and the like.

Some of the steps described above may not necessarily be performed every time that the process 400 is performed to determine a new input overcurrent limit. For example, sometimes there might be no planned load increase at the time the process 400 is performed, in which case the process 400 may be performed without step 406. In some examples, the power supply controller may perform the process 400 repeatedly (e.g., periodically), so that the input overcurrent limit can be updated dynamically to reflect current conditions of the system.

Figure 6:
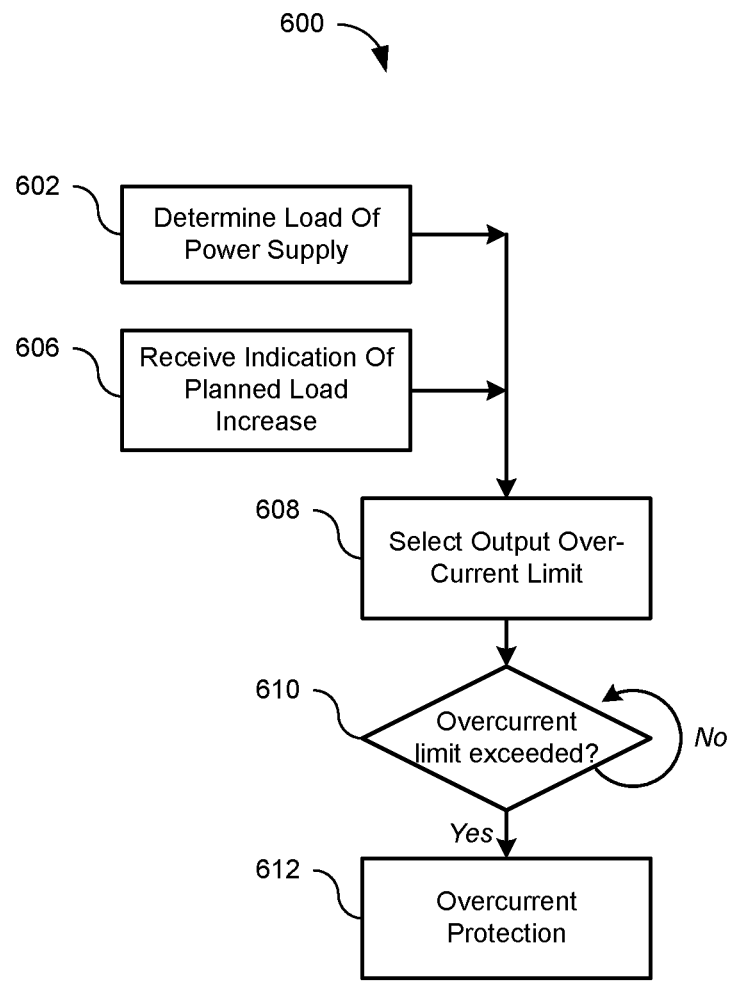
FIG. 6 shows a process for output overcurrent protection according to embodiments of the technology disclosed herein.

A similar procedure may be employed for output overcurrent protection. FIG. 6 shows a process 600 for output overcurrent protection according to embodiments of the technology disclosed herein. Referring to FIG. 6, the process may determine a load of the power supply 202, at 602. The load may be sensed and determined as described above for input overcurrent protection.

The process 600 may receive an indication of a planned load increase, at 606, for example as described above for input overcurrent protection.

The process 600 may select an output overcurrent limit, at 608. The output overcurrent limit may be selected according to a load of the power supply 202, a planned load increase by the server motherboard 204, or both. The output overcurrent limit may be selected according to an output overcurrent limit table.

Figure 7:
FIG. 7 shows an output overcurrent table according to embodiments of the technology disclosed herein.

FIG. 7 shows an example output overcurrent table 700 for an example power supply according to embodiments of the technology disclosed herein.

The output overcurrent table 700 may be stored in a memory in the power supply controller 212, the input overcurrent protection circuit 312, the output overcurrent protection circuit 314, or elsewhere within the power supply 202. In the current example, the output voltage is maintained in the range 12.0 to 12.3 Vdc, as shown in FIG. 7. However, other output voltages may be accommodated, and reflected in the output overcurrent table 700. In the output overcurrent table 700 of FIG. 7, output overcurrent limits are specified according to percentages of full load. In particular, the percentages are broken into four quartiles, each with a specified output overcurrent limit. For example, referring to FIG. 7, for a 30% load, the output overcurrent limit is 66 A. As another example, referring again to FIG. 7, for an 80% load, the output overcurrent is limited to 100 A.

Referring again to FIG. 6, after selecting an output overcurrent limit, process 600 monitors the output current of the power supply 202 according to the selected output overcurrent limit, at 610. When the output current of the power supply 202 exceeds the selected output overcurrent limit, process 400 takes one or more overcurrent protection measures, at 612. For example, the output overcurrent protection circuit 314 may shut down the power supply 202, and the like.

In some embodiments, the input overcurrent protection circuit 312 operates according to a fixed delay interval to ensure that input current spikes are not due to transient load changes. In one example, the delay interval may be in the range 100 ms to 500 ms. In some embodiments, as the input current of the power supply 202 increases beyond the rating of the power supply 202, this delay interval is reduced.

Figure 8:
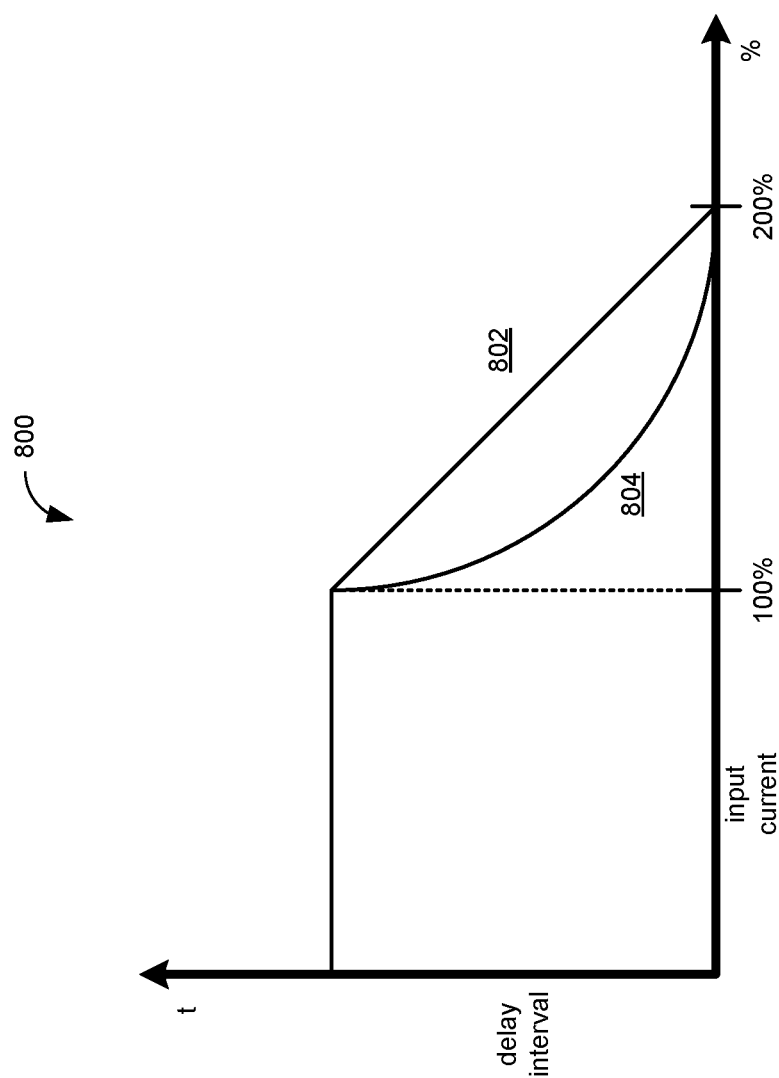
FIG. 8 shows a timing scheme for reduction of the input overcurrent protection delay interval according to some embodiments of the technology disclosed herein.

FIG. 8 shows a timing scheme 800 for reduction of the input overcurrent protection delay interval according to some embodiments of the technology disclosed herein. Referring to FIG. 8, a fixed delay interval is employed while the input current is within the rating of the power supply 202, that is, below 100% of the input current rating of the power supply 202. But when the input current rises beyond the rating of the power supply 202, the delay interval is reduced. In the example of FIG. 8, when the input current reaches 200% of the input current rating of the power supply 202, the delay interval is reduced to zero. In some embodiments, the delay interval is reduced linearly between 100% and 200% of the input current rating, as shown at 802. In other embodiments, the delay interval is reduced parabolically, as shown at 804. However, any reduction curve may be employed.

Figure 9:
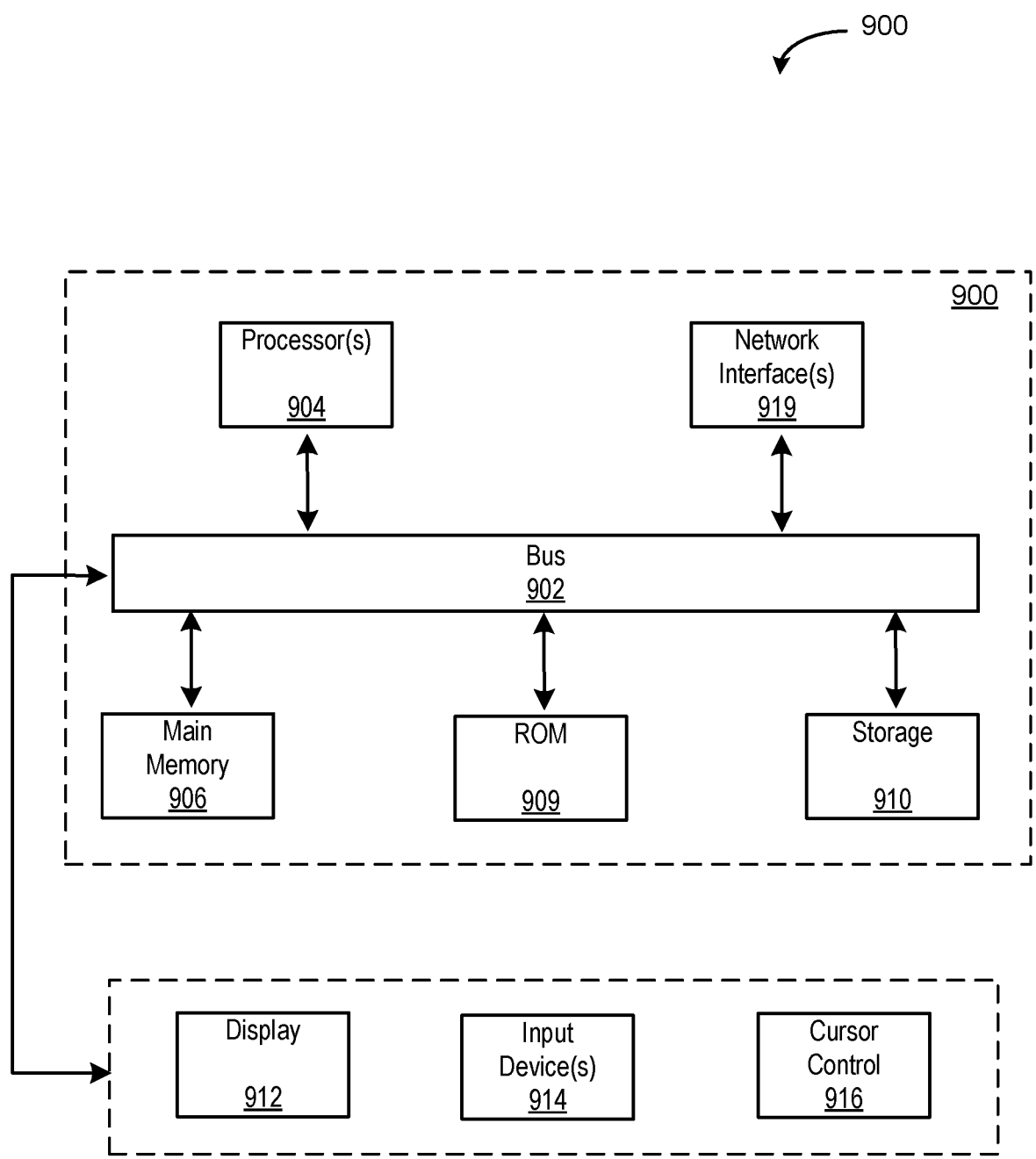
FIG. 9 is an example computing component that may be used to implement various features of embodiments described in the present disclosure.

FIG. 9 depicts a block diagram of an example computer system 900 in which various of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some embodiments, the same direction information and command selections as cursor control may be implemented via receiving touches on a touch screen without a cursor.

The computing system 900 may include a user interface circuit to implement a GUI that may be stored in a mass storage device as executable software codes that are executed by the computing device(s). This and other circuits may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a communication interface 918 coupled to bus 902. Network interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, network interface 918 may be a local area network (LAN) card to provide a data communication connection to a compatible LAN (or WAN component to communicated with a WAN). Wireless links may also be implemented. In any such implementation, network interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for a power supply, the method comprising:
   determining a load of the power supply;
   receiving an indication of a planned increase in the load of the power supply;
   selecting an over-current limit, among a plurality of over-current limits, based on the planned increase in the load of the power supply; and
   responsive to an input current of the power supply, an output current of the power supply, or both exceeding the selected over-current limit, taking the one or more overcurrent protection measures prior to the increase in the load of the power supply.

2. The method of claim 1, further comprising:
   determining an input voltage of the power supply;
   selecting a second over-current limit of the over-current limits based on the determined load of the power supply and the determined input voltage of the power supply; and
   responsive to an input current of the power supply exceeding the selected second over-current limit, taking the one or more overcurrent protection measures.

3. The method of claim 2, wherein taking the one or more overcurrent protection measures comprises:
   taking the one or more overcurrent protection measures only after a delay interval; and
   reducing the delay interval responsive to the load being greater than a load rating.

4. The method of claim 2, further comprising:
   detecting a change in the input voltage of the power supply;
   selecting a third over-current limit of the over-current limits based on the load of the power supply and the change in the input voltage of the power supply; and
   taking the one or more overcurrent protection measures in accordance with the third over-current limit.

5. A system, comprising:
   a hardware processor; and
   a non-transitory machine-readable storage medium encoded with instructions executable by the hardware processor to perform a method comprising:
   determining a load of the power supply;
   receiving an indication of a planned increase in the load of the power supply;
   selecting an over-current limit, among a plurality of over-current limits, based on the planned increase in the load of the power supply; and
   responsive to an input current of the power supply, an output current of the power supply, or both exceeding the selected over-current limit, taking the one or more overcurrent protection measures prior to the increase in the load of the power supply.

6. The system of claim 5, the method further comprising:
   determining an input voltage of the power supply;
   selecting a second over-current limit of the over-current limits based on the determined load of the power supply and the determined input voltage of the power supply; and
   responsive to an input current of the power supply exceeding the selected second over-current limit, taking the one or more overcurrent protection measures.

7. The system of claim 6, wherein taking the one or more overcurrent protection measures comprises:
   taking the one or more overcurrent protection measures only after a delay interval; and
   reducing the delay interval responsive to the load being greater than a load rating.

8. The system of claim 7, wherein reducing the delay interval comprises at least one of:
   reducing the delay interval linearly according to the load and the load rating; and
   reducing the delay interval parabolically according to the load and the load rating.

9. The system of claim 6, the method further comprising:
   detecting a change in the input voltage of the power supply;
   selecting a third overcurrent limit of the over-current limits based on the load of the power supply and the change in the input voltage of the power supply; and
   taking the one or more overcurrent protection measures in accordance with the third over-current limit.

10. A non-transitory machine-readable storage medium encoded with instructions executable by a hardware processor of a computing component, the machine-readable storage medium comprising instructions to cause the hardware processor to perform a method comprising:
    determining a load of the power supply;
    selecting an over-current limit, among a plurality of the over-current limits, based on the determined load of the power supply;
    responsive to an input current of the power supply, an output current of the power supply, or both exceeding the identified over-current limit, taking one or more overcurrent protection measures;
    receiving an indication of a planned increase in the load of the power supply;
    selecting a second over-current limit of the over-current limits based on the planned increase in the load of the power supply; and
    responsive to an input current of the power supply, an output current of the power supply, or both exceeding the selected second over-current limit, taking the one or more overcurrent protection measures prior to the increase in the load of the power supply.

11. The medium of claim 10, the method further comprising:
    determining an input voltage of the power supply;
    selecting a third overcurrent limit of the over-current limits based on the determined load of the power supply and the determined input voltage of the power supply; and responsive to an input current of the power supply, an output current of the power supply, or both exceeding the selected third over-current limit, taking the one or more overcurrent protection measures.

12. The medium of claim 11, wherein limiting the input current of the power supply in accordance with the one of the over-current limits comprises:
   taking the one or more overcurrent protection measures only after a delay interval; and
   reducing the delay interval responsive to the load being greater than a load rating.

13. The medium of claim 12, wherein reducing the delay interval comprises at least one of:
   reducing the delay interval linearly according to the load and the load rating; and
   reducing the delay interval parabolically according to the load and the load rating.

14. The medium of claim 11, the method further comprising:
   detecting a change in the input voltage of the power supply;
   selecting a fourth overcurrent limit of the over-current limits based on the load of the power supply and the change in the input voltage of the power supply; and
   taking the one or more overcurrent protection measures in accordance with the fourth over-current limit.

* * * * *